US011887561B2

(12) United States Patent
Kato

(10) Patent No.: US 11,887,561 B2
(45) Date of Patent: Jan. 30, 2024

(54) METHOD OF DETERMINING PIXEL LUMINANCE AND DISPLAY DEVICE EMPLOYING THE SAME

(71) Applicant: Samsung Display Co., Ltd., Yongin-Si (KR)

(72) Inventor: Takeshi Kato, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 6 days.

(21) Appl. No.: 17/320,746

(22) Filed: May 14, 2021

(65) Prior Publication Data

US 2021/0407464 A1 Dec. 30, 2021

(30) Foreign Application Priority Data

Jun. 26, 2020 (KR) ........................ 10-2020-0078688

(51) Int. Cl.
*G09G 5/20* (2006.01)
*G09G 5/10* (2006.01)

(52) U.S. Cl.
CPC ................. *G09G 5/20* (2013.01); *G09G 5/10* (2013.01); *G09G 2310/0232* (2013.01)

(58) Field of Classification Search
CPC .... G09G 5/20; G09G 5/10; G09G 2310/0232; G09G 3/3208; G09G 2360/16
See application file for complete search history.

(56) References Cited

U.S. PATENT DOCUMENTS

| | | | | |
|---|---|---|---|---|
| 6,654,017 | B1 * | 11/2003 | Ali-Santosa | G06T 11/203 345/611 |
| 10,283,062 | B2 | 5/2019 | Jin et al. | |
| 11,170,739 | B2 * | 11/2021 | Li | G09G 3/20 |
| 2012/0013602 | A1 * | 1/2012 | Lee | H04N 13/305 345/419 |
| 2018/0122283 | A1 * | 5/2018 | Kim | G09G 3/2003 |
| 2018/0144698 | A1 * | 5/2018 | Park | G09G 3/3607 |
| 2020/0074918 | A1 * | 3/2020 | Yang | G09G 3/22 |
| 2021/0375191 | A1 * | 12/2021 | Sun | G09G 3/20 |

FOREIGN PATENT DOCUMENTS

| | | | |
|---|---|---|---|
| KR | 1020150041459 | A | 4/2015 |
| KR | 1020180029181 | A | 3/2018 |
| WO | 2018026503 | A1 | 2/2018 |

* cited by examiner

*Primary Examiner* — Sahlu Okebato
(74) *Attorney, Agent, or Firm* — CANTOR COLBURN LLP

(57) ABSTRACT

A method of determining pixel luminance includes determining a smoothing reference line between a display region and a non-display region in a display panel, determining a boundary pixel, through which the smoothing reference line passes, among pixels included in the display region, dividing the boundary pixel into a first pixel region in the display region and a second pixel region in the non-display region based on the smoothing reference line, calculating a smoothing rate corresponding to a ratio of an area of the first pixel region to a total area of the boundary pixel, and determining dimming luminance of the boundary pixel based on the smoothing rate.

15 Claims, 9 Drawing Sheets

METHOD OF DETERMINING PIXEL LUMINANCE AND DISPLAY DEVICE EMPLOYING THE SAME

This application claims priority to Korean Patent Application No. 10-2020-0078688, filed on Jun. 26, 2020, and all the benefits accruing therefrom under 35 U.S.C. § 119, the content of which in its entirety is herein incorporated by reference.

BACKGROUND

1. Field

Embodiments relate generally to a display device. More particularly, embodiments of the disclosure relate to a method of determining pixel luminance, which performs luminance dimming on a boundary pixel, through which a boundary between a display region and a non-display region (e.g., a trench region, a hole region, a corner region, and the like) passes, in a display panel, and a display device employing the method of determining the pixel luminance.

2. Description of the Related Art

Recently, a display panel included in a display device includes a display region and a non-display region in various forms since such a display device is widely used for a wide variety of electronic devices in various forms. In one display device, for example, a corner region of the display region is curved, such that a boundary between the display region and the non-display region may be curved. In one display device, for example, the display region includes a hole region or a trench region, through which light for operations of an optical module (e.g., a camera module, a sensor module, and the like) passes, such that a boundary between the display region and the non-display region may be curved.

SUMMARY

In a display device having a curved boundary between a display region and a non-display region, a step difference in the curved boundary between the display region and the non-display region may be perceived due to pixels in a display panel, each generally having a polygonal shape (e.g., a quadrangular shape). Accordingly, display quality may be deteriorated due to the step difference perceived by a user (or viewer).

Embodiments provide a method of determining pixel luminance that effectively prevents a user from perceiving a step difference due to pixels (or sub-pixels) occurring when a boundary between a display region and a non-display region is curved in a display panel.

Embodiments provide a display device employing the method of determining the pixel luminance.

According to an embodiment, a method of determining pixel luminance may include determining a smoothing reference line between a display region and a non-display region in a display panel, determining a boundary pixel, through which the smoothing reference line passes, among pixels included in the display region, dividing the boundary pixel into a first pixel region in the display region and a second pixel region in the non-display region based on the smoothing reference line, calculating a smoothing rate corresponding to a ratio of an area of the first pixel region to a total area of the boundary pixel, and determining dimming luminance of the boundary pixel based on the smoothing rate.

In an embodiment, the dimming luminance of the boundary pixel may be calculated by multiplying luminance of the boundary pixel by the smoothing rate.

In an embodiment, dimming luminance of each of sub-pixels included in the boundary pixel may be calculated by multiplying luminance of the each of the sub-pixels by the smoothing rate.

In an embodiment, the smoothing reference line may be a curve which is convexly curved toward the display region.

In an embodiment, the non-display region may be a trench region or a hole region for an optical module disposed under the display panel.

In an embodiment, the smoothing reference line may be a curve which is convexly curved toward the non-display region.

In an embodiment, the non-display region may be a corner region of the display panel.

In an embodiment, the method may further include detecting a target sub-pixel, which is located only in the second pixel region, among sub-pixels included in the boundary pixel and additionally reducing the smoothing rate to be multiplied by luminance of the target sub-pixel.

In an embodiment, the method may further include detecting a target sub-pixel having a dominant area in the second pixel region among sub-pixels included in the boundary pixel and additionally reducing the smoothing rate to be multiplied by luminance of the target sub-pixel.

According to an embodiment, a method of determining pixel luminance may include determining a smoothing reference line between a display region and a non-display region in a display panel, determining a boundary sub-pixel, through which the smoothing reference line passes, among sub-pixels included in the display region, dividing the boundary sub-pixel into a first pixel region in the display region and a second pixel region in the non-display region based on the smoothing reference line, calculating a smoothing rate corresponding to a ratio of an area of the first pixel region to a total area of the boundary sub-pixel, and determining dimming luminance of the boundary sub-pixel based on the smoothing rate.

In an embodiment, the dimming luminance of the boundary sub-pixel may be calculated by multiplying luminance of the boundary sub-pixel by the smoothing rate.

In an embodiment, the smoothing reference line may be a curve which is convexly curved toward the display region.

In an embodiment, the non-display region may be a trench region or a hole region for an optical module that is disposed under the display panel.

In an embodiment, the smoothing reference line may be a curve which is convexly curved toward the non-display region.

In an embodiment, the non-display region may be a corner region of the display panel.

According to an embodiment, a display device may include a display panel including a display region and a non-display region and a display panel driving circuit which drives the display panel. In such an embodiment, the display panel driving circuit may perform luminance dimming on a boundary pixel, through which a smoothing reference line corresponding to a boundary between the display region and the non-display region passes, among pixels included in the display region. In such an embodiment, the display panel driving circuit may not perform the luminance dimming on a non-boundary pixel through which the smoothing reference line does not pass among the pixels.

In an embodiment, the display panel driving circuit may divide the boundary pixel into a first pixel region in the display region and a second pixel region in the non-display region based on the smoothing reference line, may calculate a smoothing rate corresponding to a ratio of an area of the first pixel region to a total area of the boundary pixel, may determine dimming luminance of the boundary pixel based on the smoothing rate, and may perform luminance compensation for image data to decrease luminance of the boundary pixel to the dimming luminance.

In an embodiment, the display panel driving circuit may calculate the dimming luminance of the boundary pixel by multiplying the luminance of the boundary pixel by the smoothing rate.

In an embodiment, the display panel driving circuit may calculate dimming luminance of each of sub-pixels included in the boundary pixel by multiplying luminance of the each of the sub-pixels by the smoothing rate.

In an embodiment, the display panel driving circuit may detect a target sub-pixel, which is located only in the second pixel region, among sub-pixels included in the boundary pixel and may additionally reduce the smoothing rate to be multiplied by luminance of the target sub-pixel.

In an embodiment, the display panel driving circuit may detect a target sub-pixel having a dominant area in the second pixel region among sub-pixels included in the boundary pixel and may additionally reduce the smoothing rate to be multiplied by luminance of the target sub-pixel.

Therefore, embodiments of a method of determining pixel luminance may effectively prevent a user from perceiving a step difference due to pixels (or sub-pixels) occurring when a boundary between a display region and a non-display region is curved in a display panel by determining a smoothing reference line between the display region and the non-display region in the display panel, by determining a boundary pixel (or a boundary sub-pixel), through which the smoothing reference line passes, among pixels (or sub-pixels) included in the display region, by dividing the boundary pixel (or the boundary sub-pixel) into a first pixel region in the display region and a second pixel region in the non-display region based on (or with respect to) the smoothing reference line, by calculating a smoothing rate corresponding to a ratio of an area of the first pixel region to a total area of the boundary pixel (or the boundary sub-pixel), and by determining dimming luminance of the boundary pixel (or the boundary sub-pixel) based on the smoothing rate. As a result, display quality deterioration due to user's perception of the step difference may be effectively prevented.

In embodiments, a display device employing the method of determining the pixel luminance may provide a high quality image to a user (or viewer) by preventing the user from perceiving a step difference due to pixels (or sub-pixels) occurring when a boundary between a display region and a non-display region is curved in a display panel

BRIEF DESCRIPTION OF THE DRAWINGS

The above and other features of the invention will become more apparent by describing in further detail embodiments thereof with reference to the accompanying drawings.

DETAILED DESCRIPTION

Figure 1:
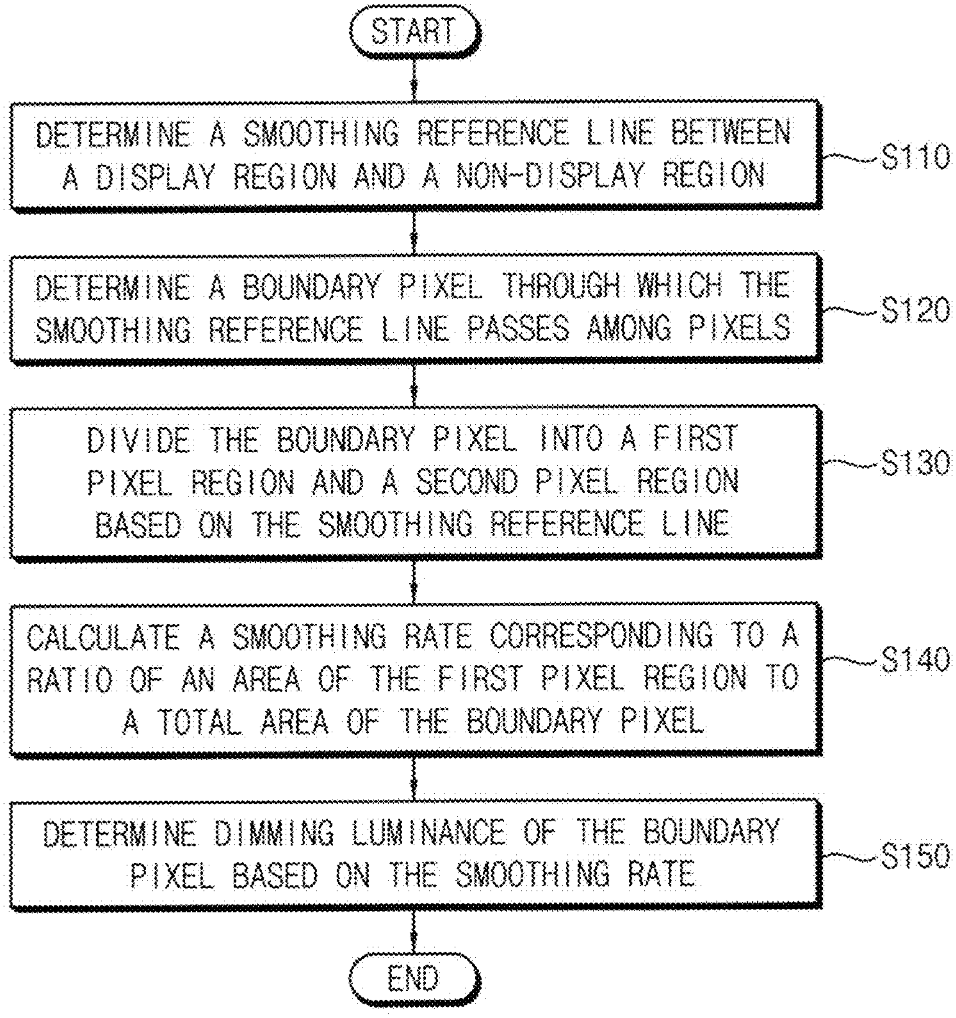
FIG. 1 is a flowchart illustrating a method of determining pixel luminance according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described in detail with reference to the accompanying drawings.

Figure 2A:
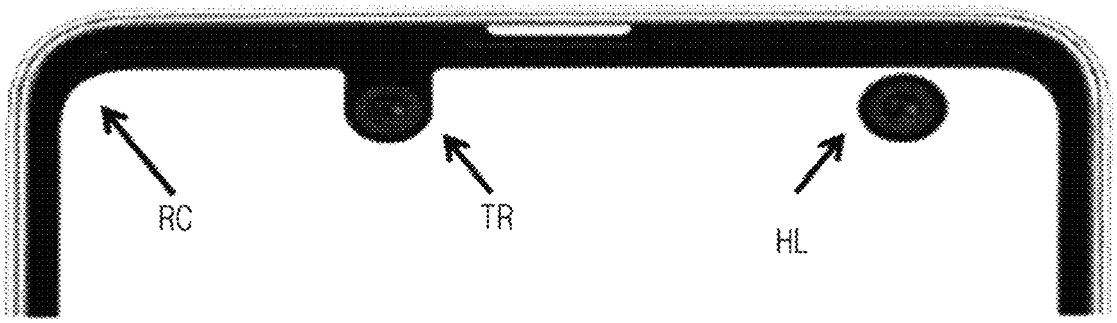
FIGS. 2A and 2B are diagrams illustrating a display panel to which the method of FIG. 1 is applied.
Figure 2B:
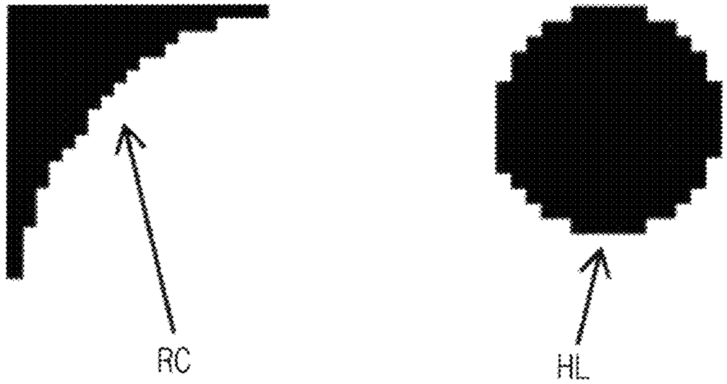
Figure 3:
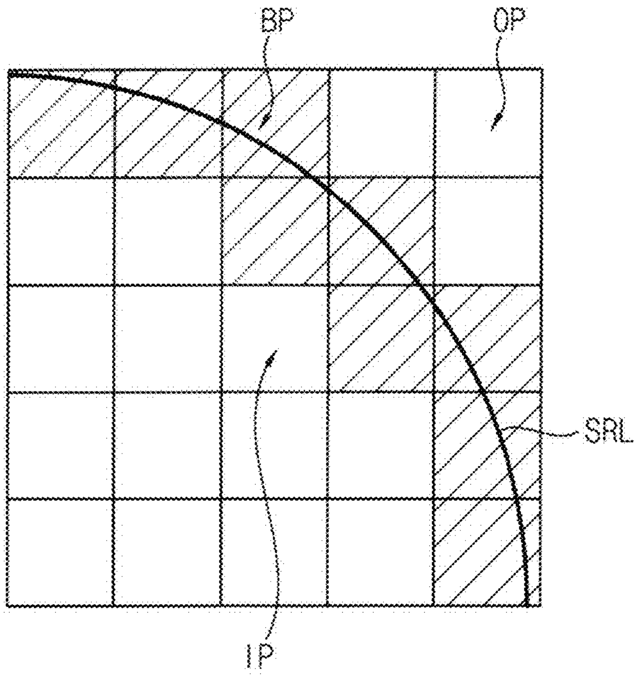
FIGS. 3 and 4 are diagrams for describing the method of FIG. 1.
Figure 4:
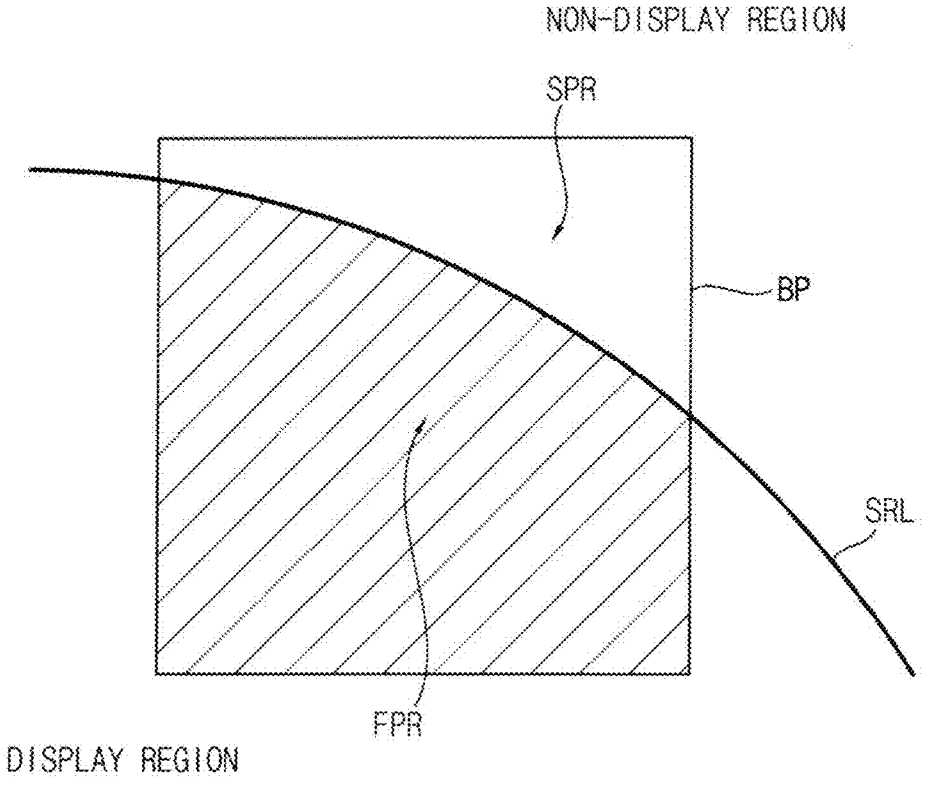
Figure 5:
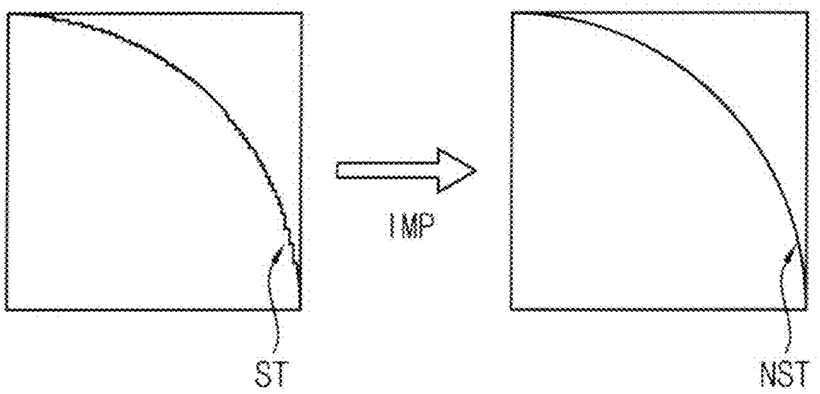
FIG. 5 is a diagram illustrating a boundary between a display region and a non-display region which is improved by the method of FIG. 1.

FIG. 1 is a flowchart illustrating a method of determining pixel luminance according to an embodiment, FIGS. 2A and 2B are diagrams illustrating a display panel to which the method of FIG. 1 is applied, FIGS. 3 and 4 are diagrams for describing the method of FIG. 1, and FIG. 5 is a diagram illustrating a boundary between a display region and a non-display region is improved by the method of FIG. 1.

Referring to FIGS. 1 to 5, an embodiment of the method of determining pixel luminance may include determining a smoothing reference line SRL between a display region (i.e., indicated by DISPLAY REGION in FIG. 4) and a non-display region (i.e., indicated by NON-DISPLAY REGION in FIG. 4) in a display panel (S110), determining a boundary pixel BP, through which the smoothing reference line SRL passes, among pixels included in the display region (S120), dividing the boundary pixel BP into a first pixel region FPR directed toward (or included in) the display region and a second pixel region SPR directed toward (or included in) the non-display region based on (or with respect to) the smoothing reference line SRL (S130), calculating a smoothing rate corresponding to a ratio of an area of the first pixel region FPR to a total area of the boundary pixel BP (S140), and determining dimming luminance of the boundary pixel BP based on the smoothing rate (S150).

In an embodiment, the method of FIG. 1 may determine the smoothing reference line SRL between the display region and the non-display region in the display panel (S110) and may determine the boundary pixel BP, through which the smoothing reference line SRL passes, among the pixels included in the display region (S120). Generally, the display panel may include the display region and the non-display region in various forms. In one embodiment, for example, as shown in FIG. 2A, as a corner region of the display panel (i.e., indicated by RC) is curved, the boundary between the display region and the non-display region may be curved (i.e., may have a curve shape). In an embodiment, as the display region includes a hole region (i.e., indicated by HL) or a trench region (i.e., indicated by TR), through which light for operations of an optical module passes, the boundary between the display region and the non-display region may be curved (i.e., may have a curve shape). However, since each pixel included in the display panel generally has a polygonal shape, as shown in FIG. 2B, a step difference due to the boundary pixels BP, through which the smoothing reference line SRL passes, may occur when the boundary between the display region and the non-display region is curved. Thus, display quality deterioration may occur as a user (or viewer) perceives the step difference. In other words, because the second pixel regions SPR of the boundary pixels BP emit light although it is desired for the user to recognize the smoothing reference line SRL as the boundary between the display region and the non-display region, the user may perceive the step difference due to the second pixel regions SPR of the boundary pixels BP. Accordingly, in an embodiment of the method of FIG. 1, the user may be allowed to recognize the smoothing reference line SRL as the boundary between the display region and the non-display region by performing luminance dimming on the boundary pixel BP, through which the smoothing reference line SRL passes.

The method of FIG. 1 may divide the boundary pixel BP into the first pixel region FPR directed toward (or included in) the display region and the second pixel region SPR directed toward (or included in) the non-display region based on the smoothing reference line SRL (S130). In an embodiment, as shown in FIG. 3, the smoothing reference line SRL may be a curve that is convexly curved toward the non-display region (i.e., indicated by NON-DISPLAY REGION). In such an embodiment, the non-display region may have a concave shape, and the display region may have a convex shape. In one embodiment, for example, the non-display region may be the corner region RC of the display panel. In an alternative embodiment, the smoothing reference line SRL may be a curve that is convexly curved toward the display region (i.e., indicated by DISPLAY REGION). In such an embodiment, the non-display region may have a convex shape, and the display region may have a concave shape. In one embodiment, for example, the non-display region may be the trench region TR or the hole region HL for the optical module that is disposed under the display panel. Hereinafter, for convenience of description, embodiments where the smoothing reference line SRL is a curve convexly curved toward the non-display region (i.e., indicated by NON-DISPLAY REGION) will be described in detail. In such embodiments, as shown in FIG. 3, the display panel may include the boundary pixels BP, through which the smoothing reference line SRL passes, inner non-boundary pixels IP, through which the smoothing reference line SRL does not pass, which are located in the display region, and outer non-boundary pixels OP, through which the smoothing reference line SRL does not pass, which are located in the non-display region. Accordingly, as shown in FIG. 4, the boundary pixel BP may be divided into the first pixel region FPR directed toward (or included in) the display region (i.e., indicated by DISPLAY REGION) and the second pixel region SPR directed toward (or included in) the non-display region (i.e., indicated by NON-DISPLAY REGION) with respect to the smoothing reference line SRL. In an embodiment, the outer non-boundary pixels OP may not exist on the display panel or may not emit light (e.g., the smoothing rate is 0) when the inner non-boundary pixels IP and the boundary pixels BP emit light.

In an embodiment, the method of FIG. 1 may calculate the smoothing rate corresponding to the ratio of the area of the first pixel region FPR to the total area of the boundary pixel BP (S140). In one embodiment, for example, when the total area of the boundary pixel BP is the same as the area of the first pixel region FPR (i.e., corresponding to the inner non-boundary pixel IP), the smoothing rate may be 1. In such an embodiment, when the total area of the boundary pixel BP is the same as the area of the second pixel region SPR (i.e., corresponding to the outer non-boundary pixel OP), the smoothing rate may be 0. Thus, the smoothing rate to be applied to the boundary pixel BP may be greater than 0 and smaller than 1. In one embodiment, for example, when the smoothing reference line SRL is a part of a circumference of a circle, coordinates of a center of the circle are (0, 0), a radius of the circle is R, the boundary pixel BP has a square shape shown in FIG. 4, horizontal and vertical lengths of the square shape shown in FIG. 4 are 1, coordinates of a first vertex of the square shape shown in FIG. 4 (i.e., a lower left vertex) are (x, y), coordinates of a second vertex of the square shape shown in FIG. 4 (i.e., a lower right vertex) is (x+1, y), coordinates of a third vertex of the square shape shown in FIG. 4 (i.e., an upper left vertex) are (x, y+1), and coordinates of a fourth vertex of the square shape shown in FIG. 4 (i.e., an upper right vertex) are (x+1, y+1), the smoothing rate to be applied to the boundary pixel BP may be calculated using Equation 1 and Equation 2 below. However, calculation of the smoothing rate to be applied to the boundary pixel BP is not limited thereto.

$$SR = \frac{y^2(R^2 - (x^2 + y^2))}{(x^2 + y^2)(2y + 1)}, \quad \text{[Equation 1]}$$

where SR denotes the smoothing rate when x≤y.

$$SR = \frac{x^2(R^2 - (x^2 + y^2))}{(x^2 + y^2)(2x + 1)}, \quad \text{[Equation 2]}$$

where SR denotes the smoothing rate when x>y.

In an embodiment, the method of FIG. 1 may determine the dimming luminance of the boundary pixel BP based on the smoothing rate (S150). In an embodiment, the dimming luminance of the boundary pixel BP may be calculated by multiplying luminance of the boundary pixel BP by the smoothing rate. In one embodiment, for example, when the luminance of the boundary pixel BP is A, the dimming luminance of the boundary pixel BP may be A×SR. In one embodiment, for example, when the luminance of the inner non-boundary pixel IP is B, the dimming luminance of the inner non-boundary pixel IP may be B×1=B. In one embodiment, for example, when the luminance of the outer non-boundary pixel OP is C, the dimming luminance of the outer non-boundary pixel OP may be C×0=0. In such an embodiment, dimming luminance of each of sub-pixels R, G, and B included in the boundary pixel BP may be calculated by multiplying luminance of each of the sub-pixels R, G, and B included in the boundary pixel BP by the smoothing rate. In one embodiment, for example, when the luminance of the red sub-pixel R included in the boundary pixel BP is A1, the dimming luminance of the red sub-pixel R included in the boundary pixel BP may be A1×SR. In one embodiment, for example, when the luminance of the green sub-pixel G included in the boundary pixel BP is A2, the dimming luminance of the green sub-pixel G included in the boundary pixel BP may be A2×SR. In one embodiment, for example, when the luminance of the blue sub-pixel B included in the boundary pixel BP is A3, the dimming luminance of the blue sub-pixel B included in the boundary pixel BP may be A3×SR. As a result, as shown in FIG. 5, the boundary between the display region and the non-display region may be improved (i.e., indicated by IMP). In a conventional display device, a step difference of a boundary (i.e., indicated by ST) may be visually recognized by the user. In an embodiment of the invention, a step difference of the boundary improved by the method of FIG. 1 (i.e., indicated by NST) may not visually recognized by the user or the recognition may be minimized (or reduced).

In an embodiment, the method of FIG. 1 may effectively prevent the user from perceiving the step difference due to the pixels occurring when the boundary between the display region and the non-display region is curved in the display panel by determining the smoothing reference line SRL between the display region (i.e., indicated by DISPLAY REGION) and the non-display region (i.e., indicated by NON-DISPLAY REGION) in the display panel, by determining the boundary pixel BP, through which the smoothing reference line SRL passes, among the pixels included in the display region, by dividing the boundary pixel BP into the first pixel region FPR directed toward (or included in) the display region and the second pixel region SPR directed toward (or included in) the non-display region based on (or with respect to) the smoothing reference line SRL, by calculating the smoothing rate corresponding to the ratio of the area of the first pixel region FPR to the total area of the boundary pixel BP, and by determining the dimming luminance of the boundary pixel BP based on the smoothing rate (i.e., calculating the dimming luminance of the boundary pixel BP by multiplying the luminance of the boundary pixel BP by the smoothing rate). As a result, display quality deterioration due to user's perception of the step difference may be effectively prevented. An embodiment of the method of FIG. 1 described above is directed to case where the smoothing reference line SRL is a curve that is convexly curved toward the non-display region (i.e., indicated by NON-DISPLAY REGION), but the method of FIG. 1 is not limited to a specific shape of the smoothing reference line SRL. Rather, the method of FIG. 1 may be applied to a case where the smoothing reference line SRL is a straight line or another case in which the smoothing reference line SRL is a curve having various forms (e.g., a zigzag form).

Figure 6:
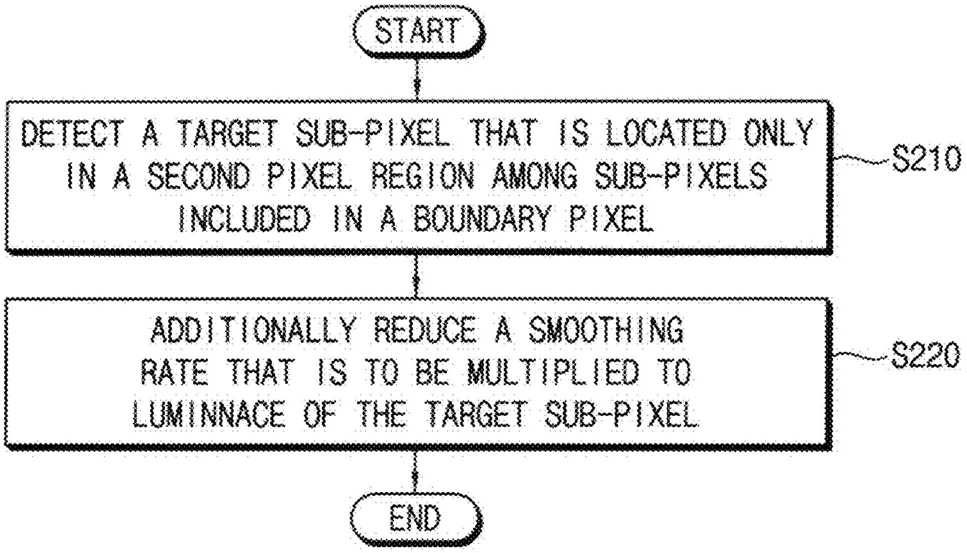
FIG. 6 is a flowchart illustrating an embodiment in which a smoothing rate to be applied to a target sub-pixel is additionally reduced by the method of FIG. 1.
Figure 7A:
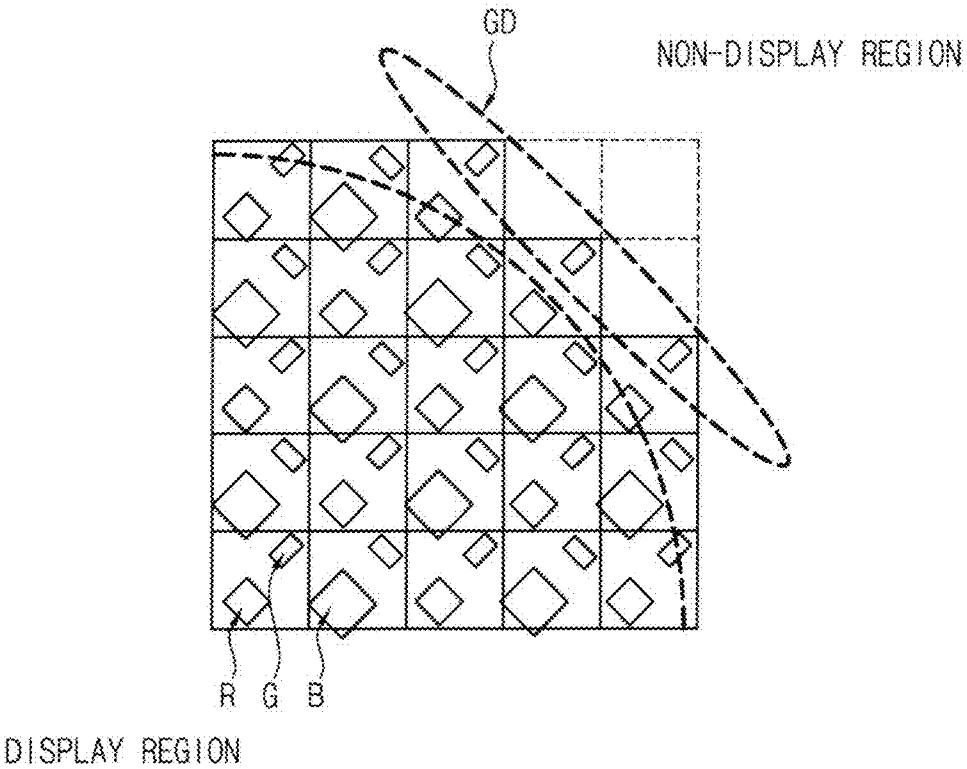
FIGS. 7A and 7B are diagrams for describing an embodiment in which a smoothing rate to be applied to a target sub-pixel is additionally reduced by the method of FIG. 1.
Figure 7B:
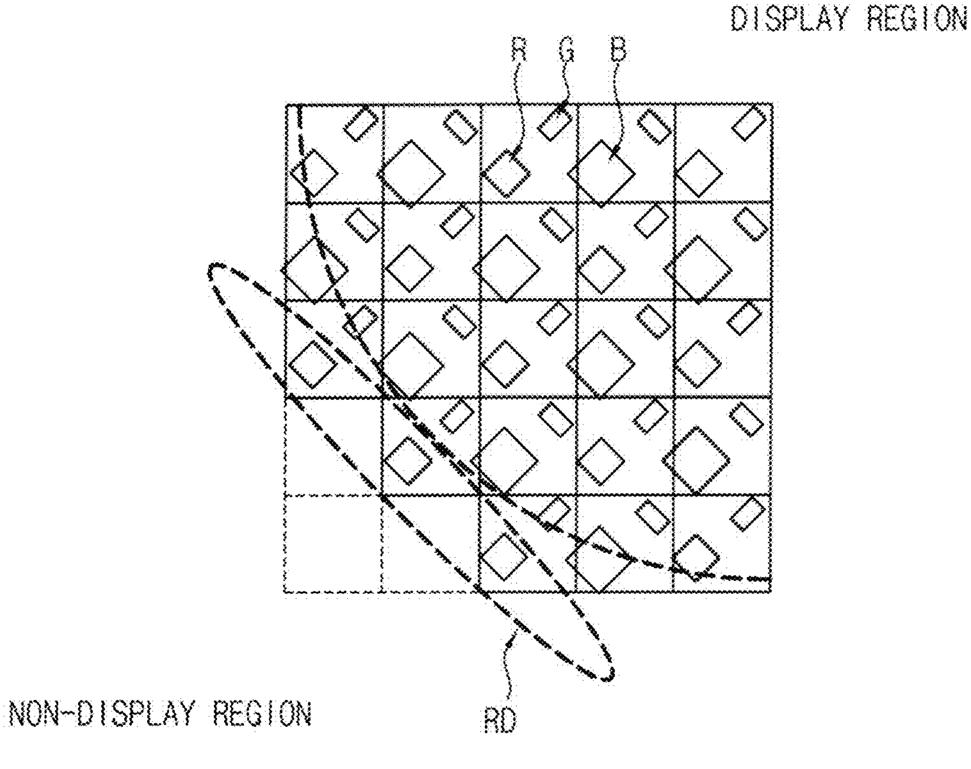

FIG. 6 is a flowchart illustrating an embodiment in which a smoothing rate to be applied to a target sub-pixel is additionally reduced by the method of FIG. 1, and FIGS. 7A and 7B are diagrams for describing an embodiment in which a smoothing rate to be applied to a target sub-pixel is additionally reduced by the method of FIG. 1.

Referring to FIGS. 5 to 7B, an embodiment of the method of FIG. 1 may detect a target sub-pixel that is located only in the second pixel region SPR among the sub-pixels R, G, and B included in the boundary pixel BP, through which the smoothing reference line SRL passes (S210), and may additionally reduce the smoothing rate that is to be multiplied by luminance of the target sub-pixel that is located only in the second pixel region SPR (S220). In one embodiment, for example, as shown in FIGS. 7A and 7B, the sub-pixels R, G, and B included in the display panel may be arranged in a diamond structure. In such an embodiment, one boundary pixel may include the red sub-pixel R and the green sub-pixel G or the blue sub-pixel B and the green sub-pixel G. Here, in the boundary pixel BP, through which the smoothing reference line SRL passes, a specific sub-pixel may be located at an outer side of the smoothing reference line SRL (i.e., a direction toward the non-display region). In one embodiment, for example, in FIG. 7A, since the green sub-pixels G are located in a row at the outer side of the smoothing reference line SRL in the boundary pixels BP, green may be undesirably strongly perceived at the outer side of the smoothing reference line SRL (i.e., indicated by GD). In one embodiment, for example, in FIG. 7B, since the red sub-pixels R are located in a row at the outer side of the smoothing reference line SRL in the boundary pixels BP, red may be undesirably strongly perceived at the outer side of the smoothing reference line SRL (i.e., indicated by RD). In an embodiment shown in FIG. 7A, the method of FIG. 1 may effectively prevent green from being strongly perceived at the outer side of the smoothing reference line SRL by additionally reducing the smoothing rate for the green sub-pixel G among the sub-pixels R, G, and B included in the boundary pixel BP, through which the smoothing reference line SRL passes. In an embodiment shown in FIG. 7B, the method of FIG. 1 may effectively prevent red from being strongly perceived at the outer side of the smoothing reference line SRL by additionally reducing the smoothing rate for the red sub-pixel R among the sub-pixels R, G, and B included in the boundary pixel BP, through which the smoothing reference line SRL passes. In such embodiments, the method of FIG. 1 may effectively prevent a specific color from being strongly perceived at the outer side of the smoothing reference line SRL by additionally reducing the smoothing rate for the target sub-pixel that is located only in the second pixel region SPR among the sub-pixels R, G, and B included in the boundary pixel BP, through which the smoothing reference line SRL passes.

Figure 8:
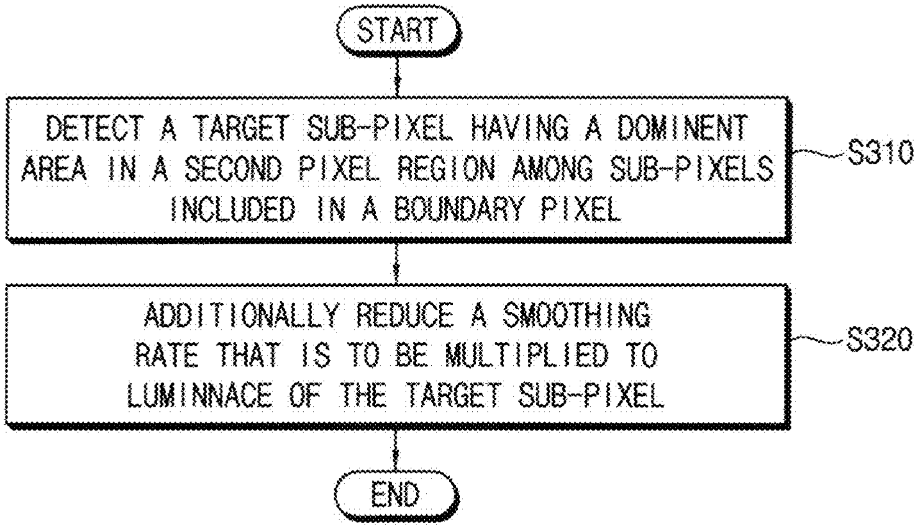
FIG. 8 is a flowchart illustrating an alternative embodiment in which a smoothing rate to be applied to a target sub-pixel is additionally reduced by the method of FIG. 1.
Figure 9:
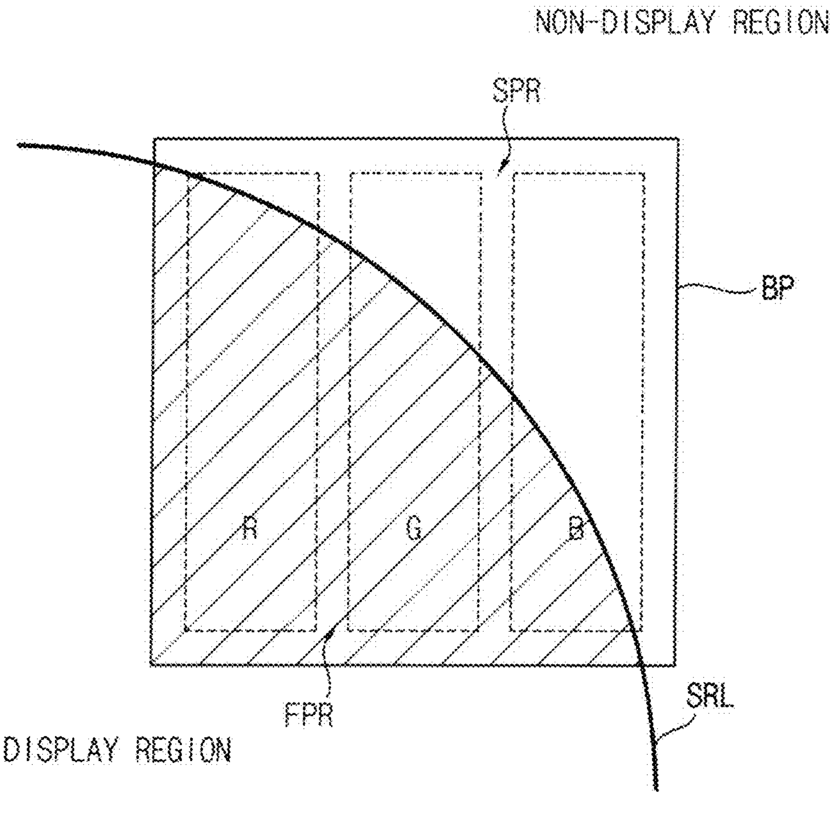
FIG. 9 is a diagram for describing a boundary between a display region and a non-display region in which a smoothing rate to be applied to a target sub-pixel is additionally reduced by the method of FIG. 1.

FIG. 8 is a flowchart illustrating an alternative embodiment in which a smoothing rate to be applied to a target sub-pixel is additionally reduced by the method of FIG. 1, and FIG. 9 is a diagram for describing an embodiment in which a smoothing rate to be applied to a target sub-pixel is additionally reduced by the method of FIG. 1.

Referring to FIGS. 8 and 9, an embodiment of the method of FIG. 1 may detect a target sub-pixel having a dominant area (or the greatest area) in the second pixel region SPR among the sub-pixels R, G, and B included in the boundary pixel BP, through which the smoothing reference line SRL passes (S310), and may additionally reduce the smoothing rate that is to be multiplied by luminance of the target sub-pixel having the dominant area in the second pixel region SPR (S320). In one embodiment, for example, as shown in FIG. 9, the sub-pixels R, G, and B included in the display panel may be arranged in an RGB stripe structure. In such an embodiment, one boundary pixel may include the red sub-pixel R, the green sub-pixel G, and the blue sub-pixel B that are arranged side by side in a specific direction. Here, in the boundary pixel BP, through which the smoothing reference line SRL passes, a specific sub-pixel may have a dominant area at an outer side of the smoothing reference line SRL (i.e., a direction toward the non-display region). In one embodiment, for example, as shown in FIG. 9, the blue sub-pixels B may have a dominant area at the outer side of the smoothing reference line SRL, such that blue may be undesirably strongly perceived at the outer side of the smoothing reference line SRL. Accordingly, in an embodiment shown in FIG. 9, the method of FIG. 1 may effectively prevent blue from being strongly perceived at the outer side of the smoothing reference line SRL by additionally reducing the smoothing rate for the blue sub-pixel B among the sub-pixels R, G, and B included in the boundary pixel BP, through which the smoothing reference line SRL passes. In such an embodiment, the method of FIG. 1 may effectively prevent a specific color from being strongly perceived at the outer side of the smoothing reference line SRL by additionally reducing the smoothing rate for the target sub-pixel having the dominant area in the second pixel region SPR among the sub-pixels R, G, and B included in the boundary pixel BP, through which the smoothing reference line SRL passes.

Figure 10:
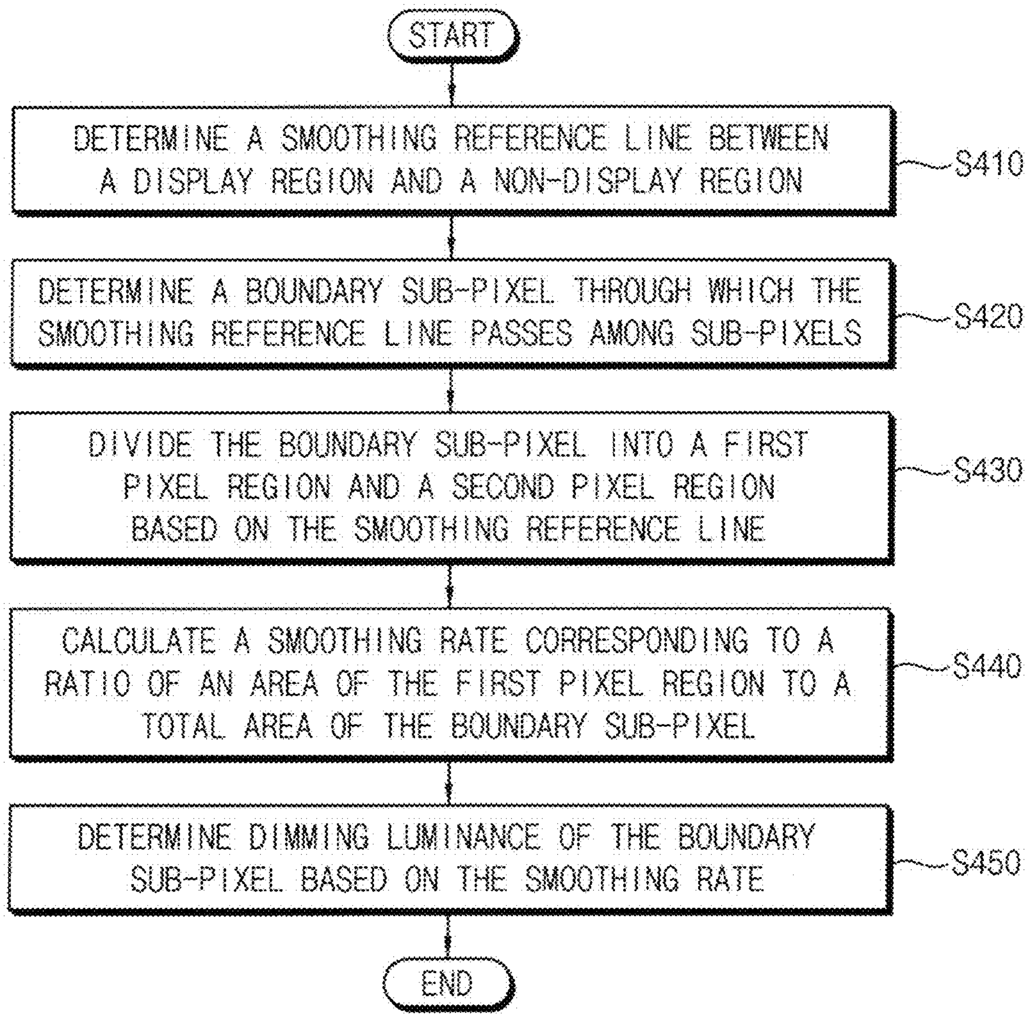
FIG. 10 is a flowchart illustrating a method of determining pixel luminance according to an alternative embodiment.

FIG. 10 is a flowchart illustrating a method of determining pixel luminance according to an alternative embodiment.

Referring to FIG. 10, an embodiment of the method of determining pixel luminance may include determining a smoothing reference line between a display region and a non-display region in a display panel (S410), determining a boundary sub-pixel, through which the smoothing reference line passes, among sub-pixels included in the display region (S420), dividing the boundary sub-pixel into a first pixel region directed toward (or included in) the display region and a second pixel region directed toward (or included in) the non-display region based on (or with respect to) the smoothing reference line (S430), calculating a smoothing rate corresponding to a ratio of an area of the first pixel region to a total area of the boundary sub-pixel (S440), and determining dimming luminance of the boundary sub-pixel based on the smoothing rate (S450). The method of FIG. 10 is substantially the same as the method of FIG. 1 except that the method of FIG. 10 is performed for each sub-pixel while the method of FIG. 1 is performed for each pixel. Thus, any repetitive detailed description of the same or like elements of the method of FIG. 10 as those of the method of FIG. 1 will be omitted.

In such an embodiment, the method of FIG. 10 may effectively prevent a user from perceiving a step difference due to the sub-pixels occurring when the boundary between the display region and the non-display region is curved in the display panel by determining the smoothing reference line between the display region and the non-display region in the display panel, by determining the boundary sub-pixel, through which the smoothing reference line passes, among the sub-pixels included in the display region, by dividing the boundary sub-pixel into the first pixel region directed toward (or included in) the display region and the second pixel region directed toward (or included in) the non-display region based on (or with respect to) the smoothing reference line, by calculating the smoothing rate corresponding to the ratio of the area of the first pixel region to the total area of the boundary sub-pixel, and by determining the dimming luminance of the boundary sub-pixel based on the smoothing rate (i.e., calculating the dimming luminance of the boundary sub-pixel by multiplying luminance of the boundary sub-pixel by the smoothing rate). As a result, display quality deterioration due to user's perception of the step difference may be effectively prevented.

Figure 11:
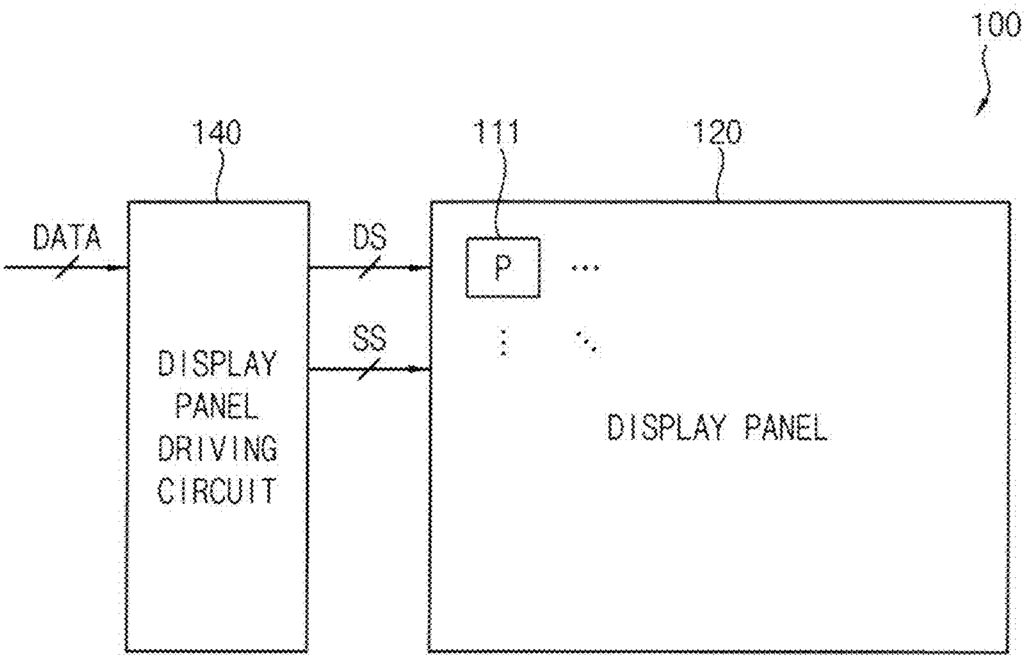
FIG. 11 is a block diagram illustrating a display device according to an embodiment.

FIG. 11 is a block diagram illustrating a display device according to an embodiment.

Referring to FIG. 11, an embodiment of the display device 100 may include a display panel 120 and a display panel driving circuit 140. In one embodiment, for example, the display device 100 may be an organic light emitting display device. However, the display device 100 is not limited thereto.

The display panel 120 may include a plurality of pixels 111. In an embodiment, each of the pixels 111 may include at least two selected from a red sub-pixel, a green sub-pixel, and a blue sub-pixel. The display panel 120 may include a display region and a non-display region. In one embodiment, for example, the non-display region may be a curved corner region of the display panel. In such an embodiment, a boundary between the display region and the non-display region may be curved (i.e., may have a curve shape). In one embodiment, for example, the non-display region may be a hole region or a trench region, through which light for operations of an optical module passes. In such an embodiment, the boundary between the display region and the non-display region may be curved (i.e., may have a curve shape). The display panel driving circuit 140 may drive the display panel 120. In an embodiment, the display panel driving circuit 140 may include a scan driver, a data driver, and a timing controller to drive the display panel 120. The display panel 120 may be connected to the scan driver via scan lines and to the data driver via data lines. The scan driver may provide a scan signal SS to the display panel 120 via the scan lines. In an embodiment, the scan driver may provide the scan signal SS to the pixels 111. The data driver may provide a data signal DS (or data voltage) to the display panel 120 via the data lines. In an embodiment, the data driver may provide the data signal DS to the pixels 111. The timing controller may control the scan driver and the data driver by generating a plurality of control signals and by providing the control signals to the scan driver and the data driver. The timing controller may perform a specific processing (e.g., deterioration compensation and the like) on image data DATA input from an external component (e.g., a graphic processing unit ("GPU") and the like). In an embodiment, where the display device 100 is an organic light emitting display device, the display panel driving circuit 140 may further include an emission control driver. In such an embodiment, the display panel 120 may be connected to an emission control driver via emission control lines, and the emission control driver may provide an emission control signal to the display panel 120 via the emission control lines. In such an embodiment, the emission control driver may provide the emission control signal to the pixels 111.

In an embodiment, the display panel driving circuit 140 may determine a smoothing reference line between the display region and the non-display region in the display panel 120, may determine a boundary pixel, through which the smoothing reference line passes, among the pixels included in the display region, may divide the boundary pixel into a first pixel region directed toward (or included in) the display region and a second pixel region directed toward (or included in) the non-display region based on (or with respect to) the smoothing reference line, may calculate a smoothing rate corresponding to a ratio of an area of the first pixel region to a total area of the boundary pixel, may determine dimming luminance of the boundary pixel based on the smoothing rate, and may perform luminance compensation for the image data DATA to reflect the dimming luminance of the boundary pixel, that is, to decrease the luminance of the boundary pixel to the dimming luminance. In such an embodiment, the display panel driving circuit 140 may calculate the dimming luminance of the boundary pixel by multiplying luminance of the boundary pixel by the smoothing rate. In addition, the display panel driving circuit 140 may calculate dimming luminance of each of sub-pixels included in the boundary pixel by multiplying luminance of each of the sub-pixels by the smoothing rate. In an embodiment, the display panel driving circuit 140 may detect a target sub-pixel that is located only in the second pixel region among the sub-pixels included in the boundary pixel and may additionally reduce the smoothing rate that is to be multiplied by luminance of the target sub-pixel. In an embodiment, the display panel driving circuit 140 may detect a target sub-pixel having a dominant area in the second pixel region among the sub-pixels included in the boundary pixel and may additionally reduce the smoothing rate that is to be multiplied by luminance of the target sub-pixel. In an alternative embodiment, the display panel driving circuit 140 may determine a smoothing reference line between the display region and the non-display region in the display panel 120, may determine a boundary sub-pixel, through which the smoothing reference line passes, among the sub-pixels included in the display region, may divide the boundary sub-pixel into a first pixel region directed toward (or included in) the display region and a second pixel region directed toward (or included in) the non-display region based on (or with respect to) the smoothing reference line, may calculate a smoothing rate corresponding to a ratio of an area of the first pixel region to a total area of the boundary sub-pixel, may determine dimming luminance of the boundary sub-pixel based on the smoothing rate, and may perform luminance compensation for the image data DATA to reflect the dimming luminance of the boundary pixel, that is, to decrease the luminance of the boundary pixel to the dimming luminance. Since operations of the display panel driving circuit 140 are substantially the same as embodiments of the method of FIG. 1 or FIG. 10 described above, any repetitive detailed description thereof will be omitted.

In such an embodiment, the display device 100 may effectively prevent a user from perceiving a step difference due to the pixels 111 (or the sub-pixels) occurring when the boundary between the display region and the non-display region is curved in the display panel 120 by determining the smoothing reference line between the display region and the non-display region in the display panel 120, by determining the boundary pixel (or the boundary sub-pixel), through which the smoothing reference line passes, among the pixels 111 (or the sub-pixels) included in the display region, by dividing the boundary pixel (or the boundary sub-pixel) into the first pixel region directed toward (or included in) the display region and the second pixel region directed toward (or included in) the non-display region based on (or with respect to) the smoothing reference line, by calculating the smoothing rate corresponding to the ratio of the area of the first pixel region to the total area of the boundary pixel (or the boundary sub-pixel), and by determining the dimming luminance of the boundary pixel (or the boundary sub-pixel) based on the smoothing rate (i.e., calculating the dimming luminance of the boundary pixel (or the boundary sub-pixel) by multiplying the luminance of the boundary pixel (or the boundary sub-pixel) by the smoothing rate). As a result, the display device 100 may provide a high quality image to the user by effectively preventing display quality deterioration due to user's perception of such a step difference.

Figure 12:
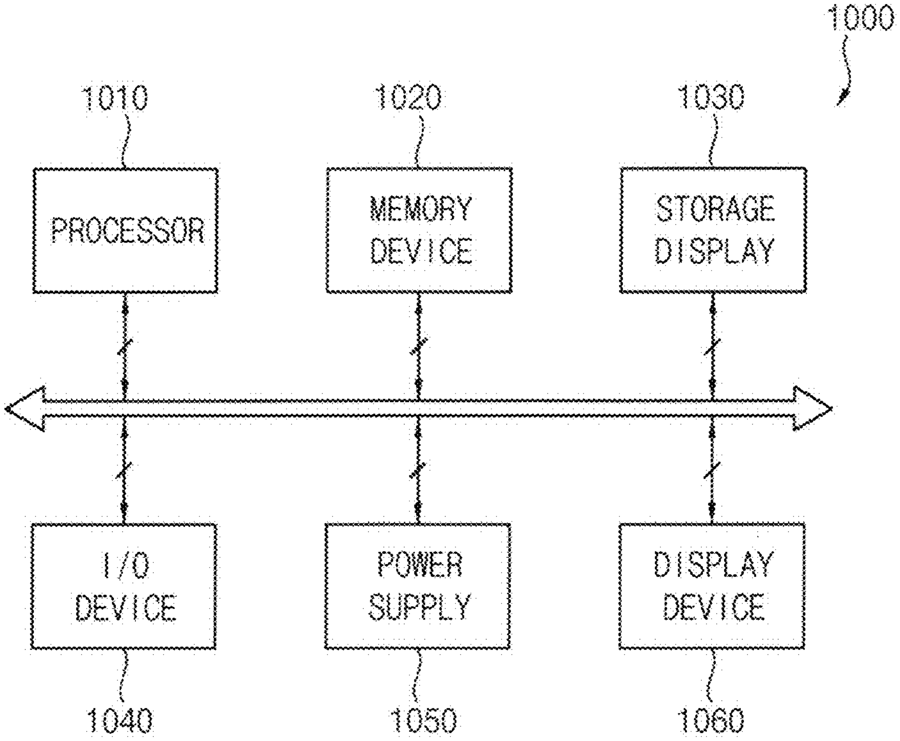
FIG. 12 is a block diagram illustrating an electronic device according to an embodiment.
Figure 13:
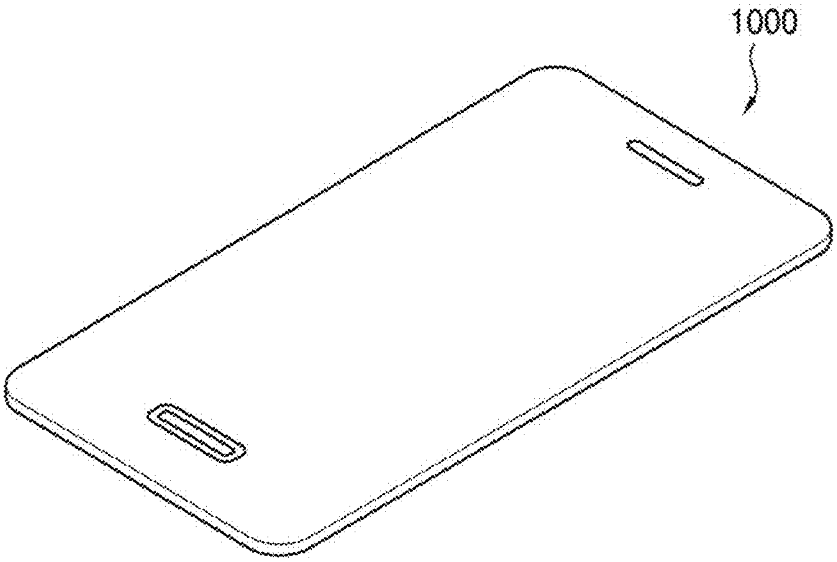
FIG. 13 is a diagram illustrating an embodiment in which the electronic device of FIG. 12 is implemented as a smart phone.

FIG. 12 is a block diagram illustrating an electronic device according to an embodiment, and FIG. 13 is a diagram illustrating an embodiment in which the electronic device of FIG. 12 is implemented as a smart phone.

Referring to FIGS. 12 and 13, an embodiment of the electronic device 1000 may include a processor 1010, a memory device 1020, a storage device 1030, an input/output ("I/O") device 1040, a power supply 1050, and a display device 1060. In such an embodiment, the display device 1060 may be the display device 100 of FIG. 11. In an embodiment, the electronic device 1000 may further include a plurality of ports for communicating with a video card, a sound card, a memory card, a universal serial bus ("USB") device, other electronic devices, and the like. In an embodiment, as illustrated in FIG. 13, the electronic device 1000 may be implemented as a smart phone. However, the electronic device 1000 is not limited thereto. In one embodiment, for example, the electronic device 1000 may be implemented as a cellular phone, a video phone, a smart pad, a smart watch, a tablet personal computer ("PC"), a car navigation system, a computer monitor, a laptop, a head mounted display ("HMD") device, and the like.

The processor 1010 may perform various computing functions. The processor 1010 may be a micro-processor, a central processing unit ("CPU"), an application processor ("AP"), and the like. The processor 1010 may be coupled to other components via an address bus, a control bus, a data bus, and the like. In an embodiment, the processor 1010 may be coupled to an extended bus such as a peripheral component interconnection ("PCI") bus. The memory device 1020 may store data for operations of the electronic device 1000. In one embodiment, for example, the memory device 1020 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, and the like and/or at least one volatile memory device such as a dynamic random access memory ("DRAM") device, a static random access memory ("SRAM") device, a mobile DRAM device, and the like. The storage device 1030 may include a solid state drive ("SSD") device, a hard disk drive ("HDD") device, a CD-ROM device, and the like. The I/O device 1040 may include an input device such as a keyboard, a keypad, a mouse device, a touch-pad, a touch-screen, and the like and an output device such as a printer, a speaker, and the like. The power supply 1050 may provide power for operations of the electronic device 1000. The display device 1060 may be coupled to other components via the buses or other communication links.

The display device 1060 may display an image corresponding to visual information of the electronic device 1000. In one embodiment, for example, the display device 1060 may be an organic light emitting display device. However, the display device 1060 is not limited thereto. In an embodiment, the display device 1060 may be included in the I/O device 1040. In such an embodiment, the display device 1060 may provide a high quality image to a user (or viewer) by preventing the user from perceiving a step difference due to pixels (or sub-pixels) occurring when a boundary between a display region and a non-display region is curved in a display panel. In such an embodiment, the display device 1060 may include a display panel that includes the display region and the non-display region and a display panel driving circuit that drives the display panel. In such an embodiment, the display panel driving circuit may determine a smoothing reference line between the display region and the non-display region in the display panel, may determine a boundary pixel (or a boundary sub-pixel), through which the smoothing reference line passes, among pixels (or sub-pixels) included in the display region, may divide the boundary pixel (or the boundary sub-pixel) into a first pixel region directed toward (or included in) the display region and a second pixel region directed toward (or included in) the non-display region based on (or with respect to) the smoothing reference line, may calculate a smoothing rate corresponding to a ratio of an area of the first pixel region to a total area of the boundary pixel (or the boundary sub-pixel), may determine dimming luminance of the boundary pixel (or the boundary sub-pixel) based on the smoothing rate (i.e., may calculate the dimming luminance of the boundary pixel (or the boundary sub-pixel) by multiplying luminance of the boundary pixel (or the boundary sub-pixel) by the smoothing rate), and may perform luminance compensation for image data to reflect the dimming luminance of the boundary pixel, that is, to decrease the luminance of the boundary pixel to the dimming luminance. Since such operations of the display panel driving circuit are substantially the same as those of embodiments of the method of FIG. 1 or FIG. 10 described above, any repetitive detailed description thereof will be omitted.

The disclosure may be applied to a display device and an electronic device including the display device. Embodiments of the disclosure may be applied to a smart phone, a cellular phone, a video phone, a smart pad, a smart watch, a tablet PC, a car navigation system, a television, a computer monitor, a laptop, a digital camera, a HMD device, and the like, for example.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A method of determining pixel luminance, the method comprising:

determining a smoothing reference line between a display region and a non-display region in a display panel;

determining a boundary pixel, through which the smoothing reference line passes, among pixels included in the display region;

dividing the boundary pixel into a first pixel region in the display region and a second pixel region in the non-display region based on the smoothing reference line;

calculating a smoothing rate corresponding to a ratio of an area of the first pixel region to a total area of the boundary pixel; and determining dimming luminance of the boundary pixel based on the smoothing rate, wherein each of the pixels includes sub-pixels, and a luminance dimming is performed on all of the sub-pixels of the boundary pixel based on the dimming luminance determined based on the smoothing rate corresponding to the ratio of the area of the first pixel region to the total area of the boundary pixel including the sub-pixels.

2. The method of claim 1, wherein the dimming luminance of the boundary pixel is calculated by multiplying luminance of the boundary pixel by the smoothing rate.

3. The method of claim 2, wherein dimming luminance of each of sub-pixels included in the boundary pixel is calculated by multiplying luminance of the each of the sub-pixels by the smoothing rate.

4. The method of claim 1, wherein the smoothing reference line is a curve which is convexly curved toward the display region.

5. The method of claim 4, wherein the non-display region is a trench region or a hole region for an optical module disposed under the display panel.

6. The method of claim 1, wherein the smoothing reference line is a curve which is convexly curved toward the non-display region.

7. The method of claim 6, wherein the non-display region is a corner region of the display panel.

8. The method of claim 1, further comprising:

detecting a target sub-pixel which is located only in the second pixel region among sub-pixels included in the boundary pixel; and additionally reducing the smoothing rate to be multiplied by luminance of the target sub-pixel.

9. The method of claim 1, further comprising:

detecting a target sub-pixel having a dominant area in the second pixel region among sub-pixels included in the boundary pixel; and additionally reducing the smoothing rate to be multiplied by luminance of the target sub-pixel.

10. A display device comprising:

a display panel including a display region and a non-display region; and a display panel driving circuit which drives the display panel, wherein the display panel driving circuit divides a boundary pixel, through which a smoothing reference line corresponding to a boundary between the display region and the non-display region passes, among pixels included in the display region into a first pixel region in the display region and a second pixel region in the non-display region based on the smoothing reference line, and performs a luminance dimming on the boundary pixel, wherein each of the pixels includes sub-pixels, and the luminance dimming is performed on all of the sub-pixels of the boundary pixel based on a dimming luminance determined based on a smoothing rate corresponding to a ratio of an area of a first pixel region to a total area of the boundary pixel including the sub-pixels, and wherein the display panel driving circuit does not perform the luminance dimming on a non-boundary pixel, through which the smoothing reference line does not pass, among the pixels.

11. The display device of claim 10, wherein the display panel driving circuit calculates the smoothing rate corresponding to the ratio of the area of the first pixel region to the total area of the boundary pixel including the sub-pixels, determines the dimming luminance of all of the sub-pixels of the boundary pixel based on the smoothing rate, and performs luminance compensation for image data to decrease luminance of all of the sub-pixels of the boundary pixel to the dimming luminance.

12. The display device of claim 11, wherein the display panel driving circuit calculates the dimming luminance of the boundary pixel by multiplying the luminance of the boundary pixel by the smoothing rate.

13. The display device of claim 12, wherein the display panel driving circuit calculates dimming luminance of each of sub-pixels included in the boundary pixel by multiplying luminance of the each of the sub-pixels by the smoothing rate.

14. The display device of claim 11, wherein the display panel driving circuit detects a target sub-pixel, which is located only in the second pixel region, among sub-pixels included in the boundary pixel and additionally reduces the smoothing rate to be multiplied by luminance of the target sub-pixel.

15. The display device of claim 11, wherein the display panel driving circuit detects a target sub-pixel having a dominant area in the second pixel region among sub-pixels included in the boundary pixel and additionally reduces the smoothing rate to be multiplied by luminance of the target sub-pixel.

* * * * *